(12) United States Patent
Stendardo et al.

(10) Patent No.: US 6,229,692 B1
(45) Date of Patent: May 8, 2001

(54) MODULAR CIRCUIT BREAKER AND MODULAR LIGHTING PANELBOARD FOR FIELD ASSEMBLY

(75) Inventors: Richard J. Stendardo, Durham, NC (US); Dennis C. Zuffelato, Kensington; Joseph E. Noonan, Bolton, both of CT (US); Robert A. Wall, Salisbury; Mitchell E. Johnson, Hickory, both of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/345,706

(22) Filed: Jun. 30, 1999

(51) Int. Cl.⁷ ........................................ H02B 1/01
(52) U.S. Cl. ................ 361/627; 174/68.2; 174/99 B; 174/72 B; 361/638
(58) Field of Search ................ 174/68.2, 70 B, 174/71 B, 72 B, 99 B, 148, 149 R, 149 B, 156; 361/627, 634, 637–640, 644, 648–650, 652, 663, 673

(56) References Cited

U.S. PATENT DOCUMENTS

| | | |
|---|---|---|
| 4,713,728 * | 12/1987 | Raabe et al. .......................... 361/363 |
| 4,783,718 * | 11/1988 | Raabe et al. .......................... 361/363 |
| 5,343,356 | 8/1994 | Hancock . |
| 5,351,165 | 9/1994 | Hancock . |

* cited by examiner

Primary Examiner—Gregory Thompson
(74) Attorney, Agent, or Firm—Cantor Colburn LLP; Carl B. Horton

(57) ABSTRACT

A circuit breaker lighting panelboard is adapted for both top and bottom feed connections with no field modification requirements. The panelboard interior accepts a variety of branch circuit breaker mounting arrangements and the mounting rails are interconnected by steel straps to reduce shipment damage.

12 Claims, 6 Drawing Sheets

MODULAR CIRCUIT BREAKER AND MODULAR LIGHTING PANELBOARD FOR FIELD ASSEMBLY

BACKGROUND OF THE INVENTION

This invention relates to circuit breakers, and, more particularly, to a modular circuit breaker and modular lighting panelboard for field assembly.

Lighting panelboards that are modularly assembled in a factory environment are described in U.S. Pat. No. 4,783,718 entitled Lighting Circuit Breaker Panelboard Modular Assembly, wherein the benefits of computer technology relating to the inventory of parts and simplification of manufacture are fully described. Circuit breakers that are modularly assembled in such a factory environment are disclosed in U.S. Pat. No. 4,713,728 entitled Lighting Circuit Breaker Panelboard Modular Assembly. It has since been determined that the modular concept of panelboard enclosure assembly and circuit breaker assembly can be extended to field installation of new panelboard assemblies as well as field modification of existing panelboard assemblies.

A more recent example of a field-installable panelboard assembly is described in U.S. Pat. No. 5,343,356 entitled Panelboard, and a recent example of a modular circuit breaker arrangement for field assembly is found in U.S. Pat. No. 5,351,165 entitled Main Circuit Breaker or Other Circuit Protection Device Connector Installation Kit for Panelboards.

SUMMARY OF THE INVENTION

In an exemplary embodiment of the invention, a circuit breaker lighting panelboard is adapted for both top and bottom feed connections with no field modification requirements. The panelboard interior accepts a variety of branch circuit breaker mounting arrangements and the mounting rails are interconnected by steel straps to reduce shipment damage. The main circuit breaker support arrangement is not integrated with the branch circuit breaker mounting arrangement to allow field installation of a wide variety of main circuit breakers.

The field panelboard installation design includes facilities for converting the panelboard from top to bottom feed, upgrading the panelboard to a two hundred percent neutral rating and changing the main circuit breaker assemblies. The invention provides a panelboard assembly that is amenable to field installation without requiring complete disassembly. The main circuit breaker of the invention provides a configuration that can be employed within a wide variety of existing panelboard assemblies and facilitate connection between the branch circuit breakers contained therein.

DESCRIPTION OF THE PREFERRED EMBODIMENT

Figure 1:
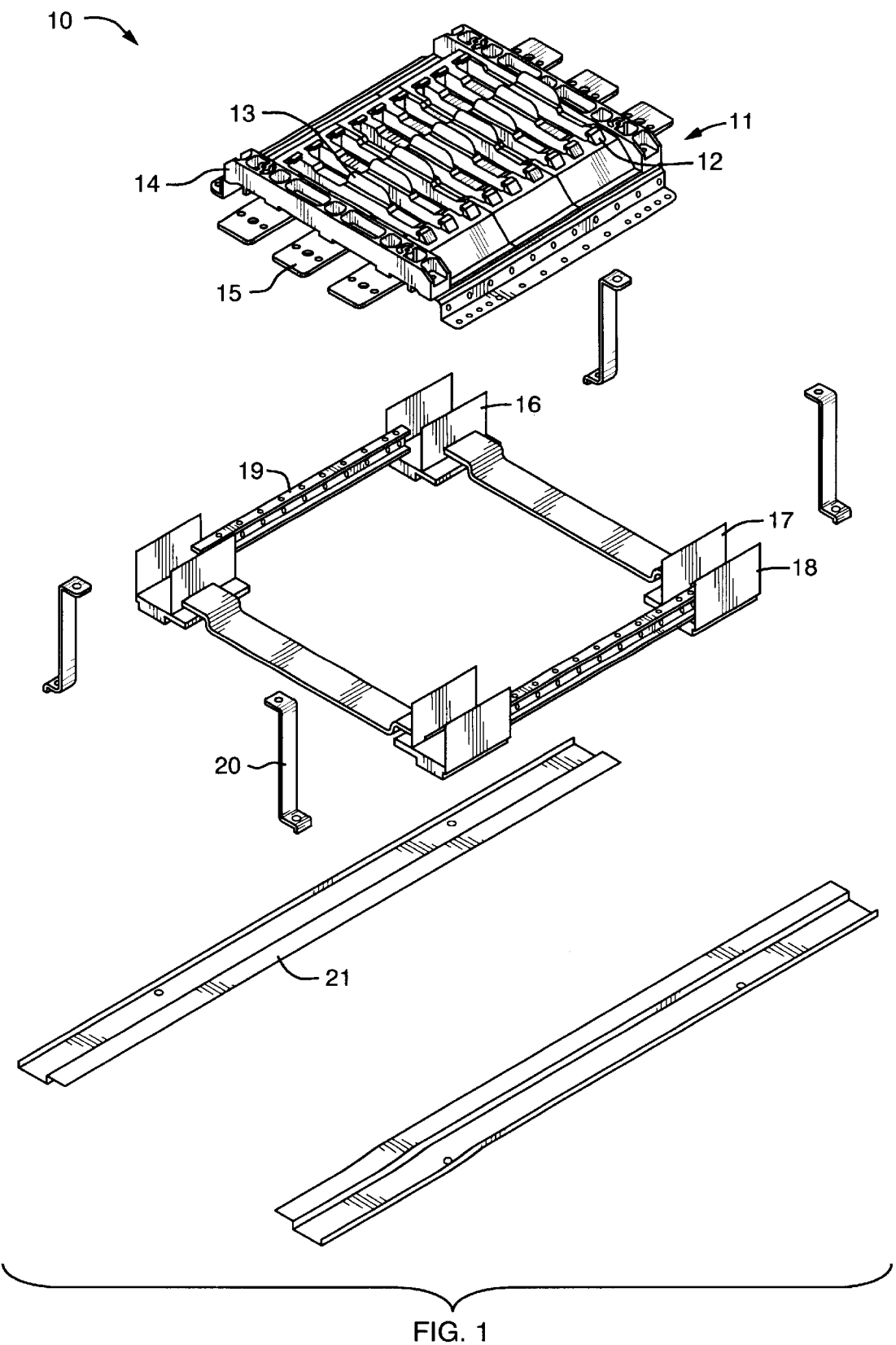
FIG. 1 is a front perspective view of a branch circuit breaker support arrangement of the invention with the support components in isometric projection.

Referring to FIG. 1, a branch circuit breaker support assembly is shown at 10 prior to attaching a branch circuit breaker assembly 11 and lug extrusions 19 to support plates 21. The branch circuit breaker assembly 11 is similar to that described in the aforementioned U.S. Pat. No. 4,783,718 (which is incorporated by reference) and consists of integrally-formed circuit breaker support hooks 12 and upstanding insulators 13 arranged between appositely arranged bus supports 14. Three bus bars 15 extend beneath the branch circuit breaker assembly 11, with each one of the bus bars being arranged for connection with one phase of a three phase electric distribution system. As would occur a person of skill in the art, a different number of busbars can be utilized depending on the number of phases being supplied. Lug extrusions 19 are joined by a pair of neutral lug cross-over straps 16 that include a pair of upstanding sidewalls 17, 18 at the opposite ends thereof. Both lug extrusions 19 are attached to support plates 21 prior to capturing the opposite sides of the branch circuit breaker assembly 11 within the subjacent upstanding sidewalls 17, 18 and attaching upstanding shield supports 20 to the opposite ends of the support plates 21.

Figure 2:
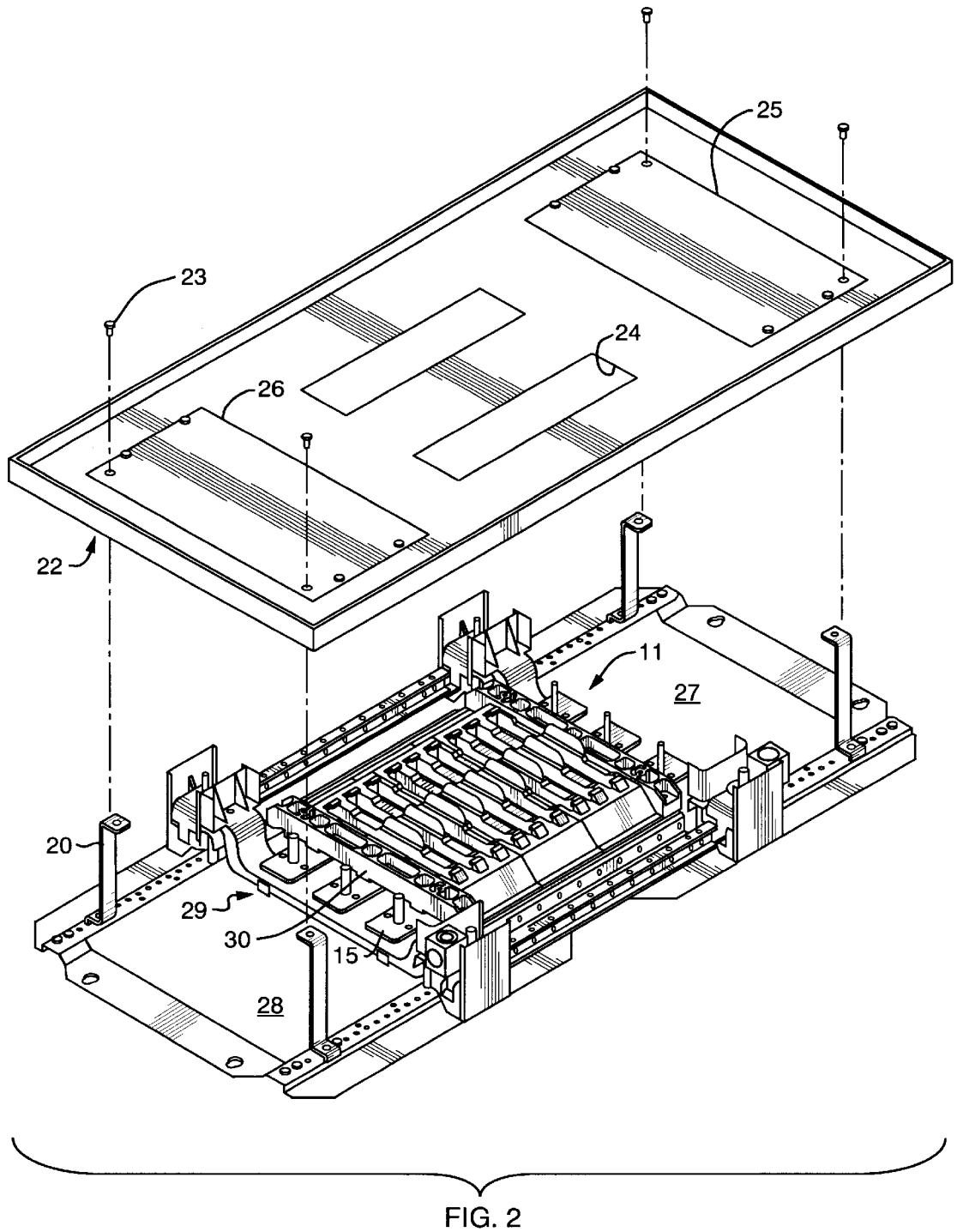
FIG. 2 is a top perspective view of the branch circuit breaker support arrangement of FIG. 1 prior to attaching the circuit breaker face plate.

Referring to FIG. 2, the arrangement of the branch circuit breaker assembly 11 subjacent a face plate 22, and intermediate a neutral lug support plate 27 and a main circuit breaker support plate 28, is shown. The bus bars 15 extend towards the main circuit breaker support plate and carry main circuit breaker bolt connectors 30 for attachment with a main circuit breaker 74 (FIG. 6) in the manner to be described below. The four upstanding shield supports 20 are arranged with a pair at one end of the neutral lug support plate 27 and another pair at one end of the main circuit breaker support plate 28 for attachment of the face plate 22 by screws 23 (or other suitable means of attachment). The attachment between the upstanding shield supports and the face plate automatically aligns branch circuit breaker handle slots 24 with the branch circuit breaker handles, not shown. This positions a main circuit breaker handle access plate 26 over the main circuit breaker support plate 28 and positions a neutral lug access plate 25 over the neutral lug support plate 27.

Figure 3:
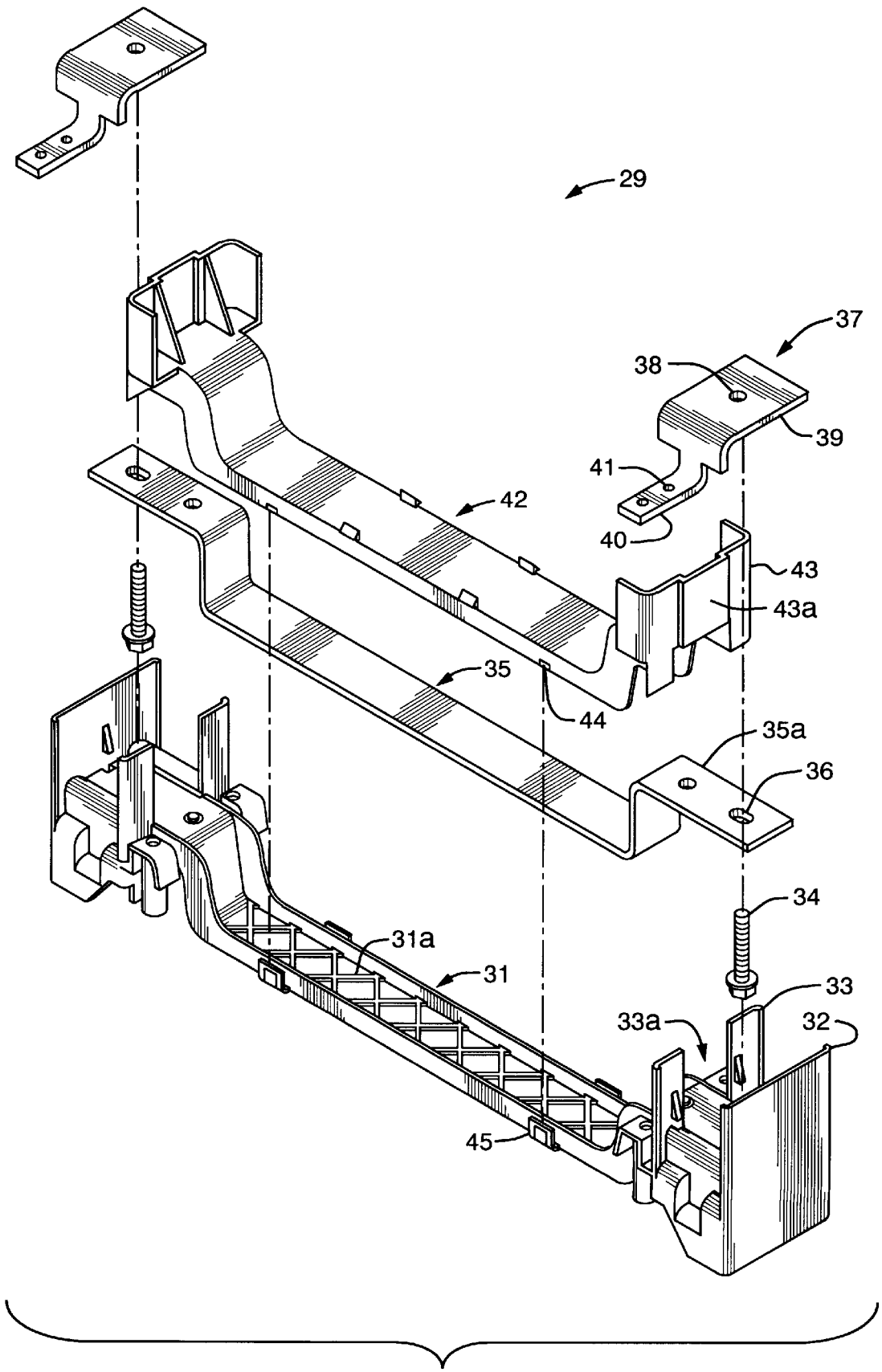
FIG. 3 is a top perspective view of the split neutral bar with the components arranged in isometric projection.
Figure 4:
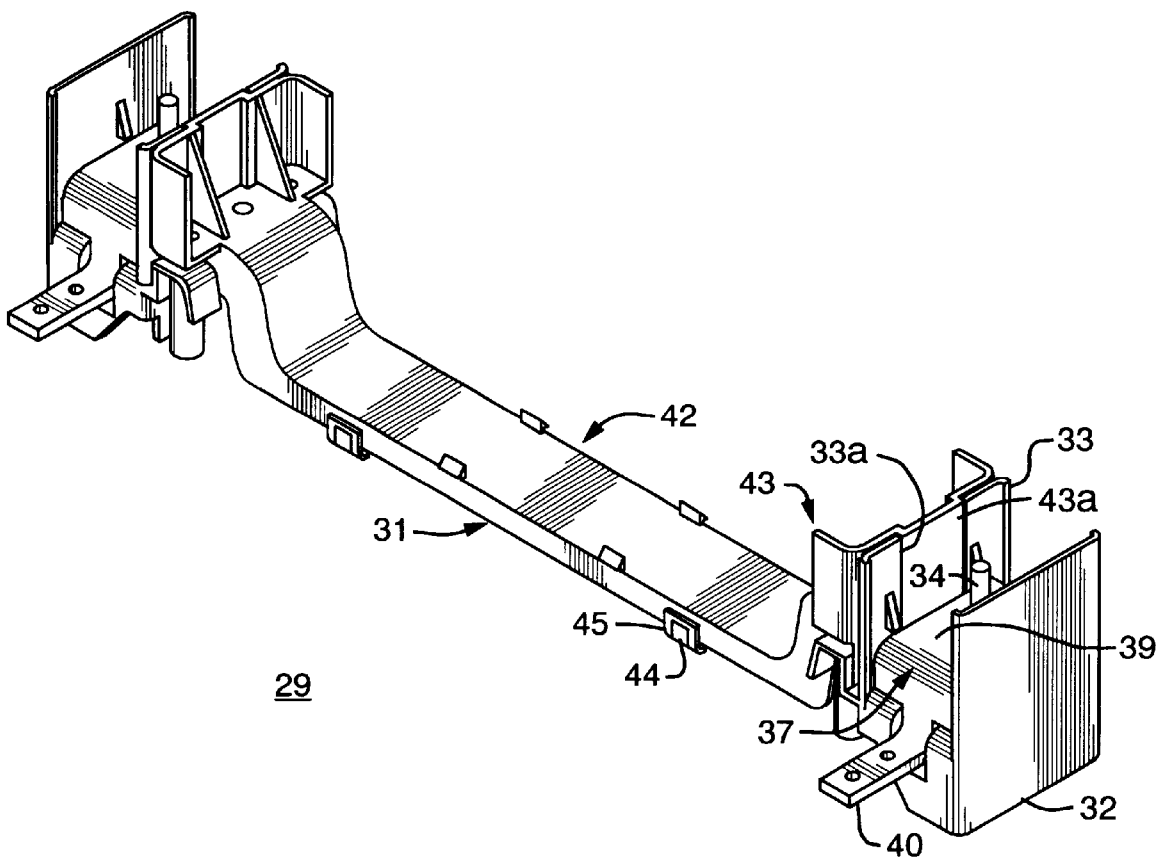
FIG. 4 is a top perspective view of the split neutral assembly of FIG. 3.

Referring to FIG. 3, a split neutral assembly 29 is shown prior to insertion of a U-shaped neutral conductor 35 in an extended recess 131 of an electrically insulative support base 31. The ends of support base 31, terminating at the upstanding insulative cover 43, are raised to receive L-shaped ends 135 of the U-shaped neutral conductor 35 which nests in a slot 133 in an insulating shield 33 and abuts against an outer insulating shield 32. A pair of bolts 34 are captured within the ends of support plate 31 and pass through thru-holes 36, 38 formed in the shaped ends 135 of the U-shaped neutral conductor 35 and a top tab 39 on a top of a neutral connector 37 respectively. A bottom tab 40 on the neutral connector 37 includes a thru-hole 41 for providing connection with an external circuit. With the U-shaped neutral conductor 35 in the electrically insulative support base 31, an insulating cover 42 is fastened to the support plate by snappingly engaging tabs 44 on the sides of the insulating cover in clips 45 extending from the sides of the support base, as shown in FIG. 4. An extension 143 on insulative plates 43 extends in the slot 133 in the insulating shield 33 for added insulation to the neutral connector 37 abutting the outer insulating shield 32 and the bolt 34 extending from the top tab 39 of the neutral connector 37.

Figure 5:
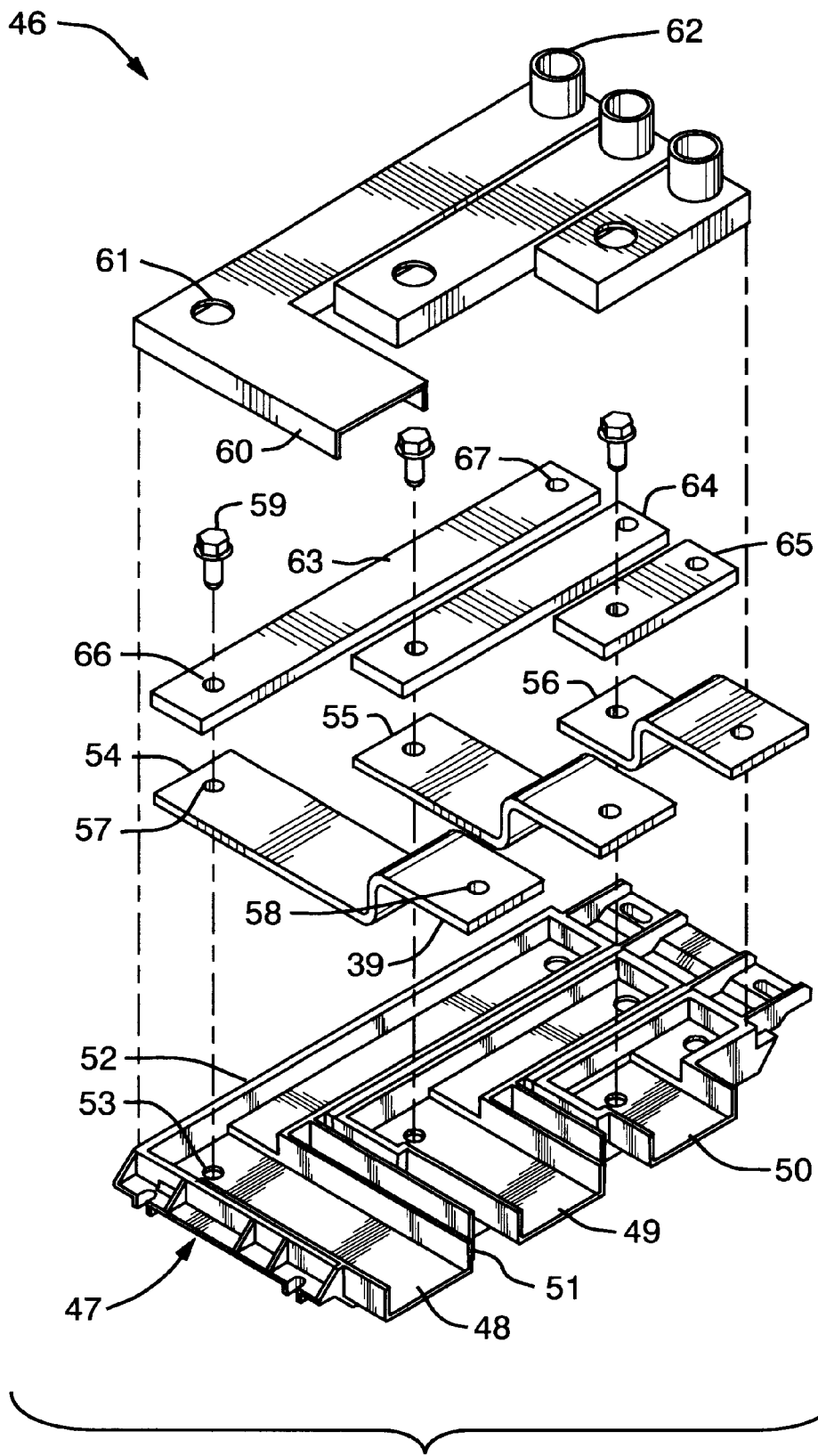
FIG. 5 is a top perspective view of the main circuit breaker support assembly of the invention with the components arranged in isometric projection.

Referring to FIG. 5, a main circuit breaker assembly 46 includes an integral shaped insulative support (base) 47 defining L-shaped channels (recesses) 48, 49, 50 having upstanding sidewalls 51, 52 for receiving stepped conductors 54, 55, 56 having thru-holes 57 which align with corresponding pockets 53 formed within the L-shaped channels. Phase conductors 63, 64, 65 are arranged perpendicular to the stepped shaped conductors and are connected therewith by bolts 59 through holes 66, aligning with the pockets 53, and thru-holes 57 within the L-shaped channels 48, 49, 50 and stepped conductors 54, 55, 56 respectively. Support covers 60 are then positioned over the assembly such that apertures 61 align with the bolts 59 for access thereto and insulative cylinders 62 upstanding from the top of the support cover provide access to the apertures 67 in the opposing ends of the phase conductors 63, 64, 65 for connection with the main circuit breaker 74, as seen in a panelboard interior 68, shown in FIG. 6.

Figure 6:
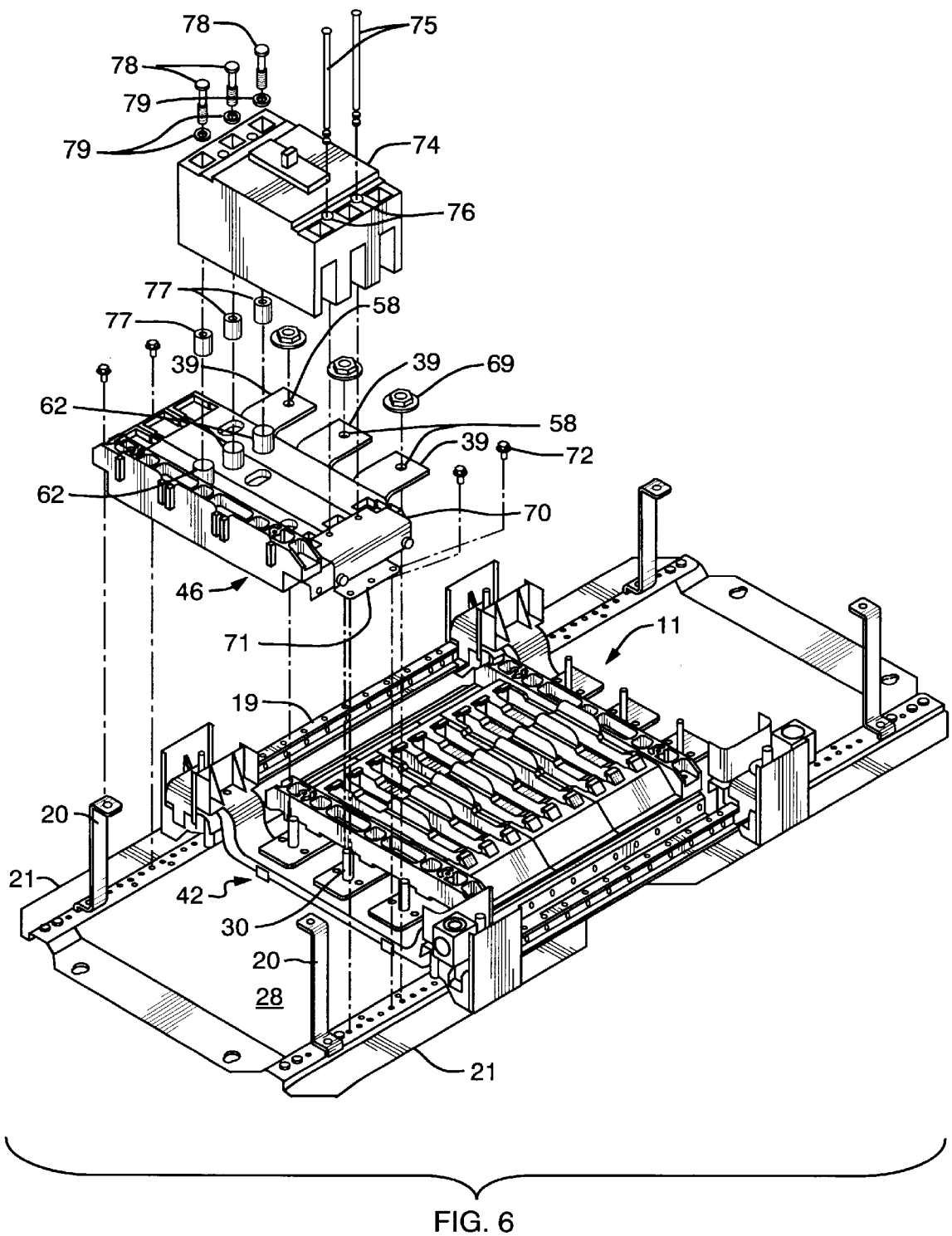
FIG. 6 is a front perspective view of the panelboard interior with the components arranged in isometric projection.

Assembly of a main circuit breaker to the main circuit breaker assembly 46 will now be described with reference to FIG. 6. Prior to attaching the face plate 22 (FIG. 2) to the shield supports 20 to complete the panelboard interior assembly, the branch circuit breaker assembly 11 is positioned for attachment of the main circuit breaker assembly 46 in the following manner: Thru-holes 58 within the top tabs 39 of stepped conductors 54, 55, 56 are positioned over main circuit breaker bolt connectors 30 on the insulating cover 42 and are connected therewith by threaded washers 69 for electrical connection between main circuit breaker 74 and an electrical distribution circuit. Electrical connection between main circuit breaker 74 and the phase conductors 63, 64, 65 (FIG. 5), is provided by bolts 78, washers 79, insulative washers 77 and insulative cylinders 62. Main circuit breaker 74 is mechanically fastened to the main circuit breaker support plate 28 by extended screws 75 through apertures 76 and apertures 73 in the main circuit breaker support plate 46 to complete the assembly of the panelboard interior 68.

Main circuit breaker support plate 46 includes bracket 70 having flange 71. Screws 72 extend through holes in flange 71 to secure main circuit breaker support plate 46 to main circuit breaker support plate 28.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A split neutral assembly comprising:
   an electrically insulative base defining an extended recess therein;
   a pair of electrically insulative shields upstanding from each end of said electrically insulative base; and
   a U-shaped neutral bus conductor arranged within said recess, said neutral bus conductor including raised ends received within said pair of electrically insulative shields.

2. The split neutral assembly of claim 1 including an electrical insulative cover having an electrically insulative plate at each end thereof, said cover covering said recess thereby enclosing said neutral bus conductor.

3. A split neutral assembly comprising:
   an electrically insulative base defining an extended recess therein;
   a pair of electrically insulative shields upstanding from each end of said electrically insulative base;
   a neutral bus conductor arranged within said recess; and
   a neutral conductor having an off-set tab arranged for connection with an associated electrical distribution circuit.

4. The split neutral assembly of claim 2 wherein one of each of said plates includes an extension, and each of said electrically insulative shields includes a slot, each of said extensions being received within each of said slots.

5. A main circuit breaker support assembly comprising:
   an electrically insulative base defining a plurality of separate L-shaped recesses;
   a corresponding plurality of stepped electrical conductors arranged within said L-shaped recesses, each of said electrical conductors having one end extending above said recesses;
   a corresponding plurality of phase conductors electrically connecting with said stepped electrical conductors at one end thereof;
   a corresponding plurality of electrically insulative L-shaped covers arranged over and enclosing said stepped electrical conductors and said phase conductors, said L-shaped covers having an aperture at one end thereof for accessing electrical connectors between said phase conductors and said stepped electrical conductors.

6. The main circuit breaker support assembly of claim 5 wherein said L-shaped covers include electrically insulative cylinders extending therefrom at an end opposite said one end for providing electrical access to said stepped electrical conductors.

7. An electric circuit breaker lighting panel board comprising:
   a plurality of electrically insulative circuit breaker hooks arranged on opposite ends of a branch circuit breaker support;
   insulating shields disposed intermediate said hooks;
   a plurality of bus bars extending at a lower portion of the branch circuit breaker support for connection with a main circuit breaker unit;
   a pair of bus supports extending across said bus bars, one at each end of the branch circuit breaker support;
   a pair of electrically insulated cross-over straps having a pair of upstanding sidewalls at opposite ends thereof extending in a first plane;
   a pair of extrusions extending between said cross-over straps, generally perpendicular to said cross-over straps, in said first plane;
   a plurality of shield supports extending generally perpendicular to said first plane for providing attachment with the electric circuit breaker lighting panelboard; and
   wherein each said electrically insulated cross-over strap comprises an electrically insulative base defining an extended recess, a pair of electrically insulative shields upstanding from each end of said electrically insulative base, a U-shaped bus conductor arranged within said recess, said bus conductor including raised ends received within said pair of electrically insulative shields, and an electrically insulative cover having electrically insulative plates at each end thereof, said cover covering said recess thereby enclosing said bus conductor.

8. The electric circuit breaker lighting panel board of claim 7 including:

a second electrically insulative base defining a plurality of separate L-shaped recesses;

a corresponding plurality of stepped electrical conductors arranged within said L-shaped recesses, each of said electrical conductors having one end extending above said recesses;

a corresponding plurality of phase conductors electrically connecting with said stepped electrical conductors at one end thereof;

a corresponding plurality of electrically insulative L-shaped covers arranged over and covering said stepped electrical conductors and said phase conductors, said L-shaped covers having an aperture at one end thereof for accessing electrical connectors between said phase conductors and said stepped electrical conductors.

9. The electric circuit breaker lighting panel board of claim 8 wherein said L-shaped covers include electrically insulative cylinders extending therefrom at an end opposite said one end for providing electrical access to said stepped electrical conductors.

10. The electric circuit breaker lighting panel board of claim 8 including a main circuit breaker electrically connected between said stepped electrical conductors and said phase conductors.

11. The electric circuit breaker support assembly of claim 7 including:

a second electrically insulative base defining a plurality of separate L-shaped recesses; and a corresponding plurality of stepped electrical conductors arranged within said L-shaped recesses, each of said electrical conductors having one end extending above said recesses.

12. The electric circuit breaker support assembly of claim 11 including a corresponding plurality of phase conductors electrically connecting with said stepped electrical conductors at one end thereof.

* * * * *